United States Patent [19]
Tang

[11] Patent Number: 5,339,184
[45] Date of Patent: Aug. 16, 1994

[54] FIBER OPTIC ANTENNA REMOTING FOR MULTI-SECTOR CELL SITES

[75] Inventor: Douglas D. Tang, Chelmsford, Mass.

[73] Assignee: GTE Laboratories Incorporated, Waltham, Mass.

[21] Appl. No.: 898,993

[22] Filed: Jun. 15, 1992

[51] Int. Cl.⁵ ............ H04J 14/02; H04B 10/00; A01F 12/20
[52] U.S. Cl. .................... 359/124; 359/152; 359/164; 359/179; 455/33.1; 370/120
[58] Field of Search ............ 359/145, 152, 157, 164, 359/174, 176, 179, 124; 455/33.1, 89, 151.2; 379/59; 370/120

[56] References Cited

U.S. PATENT DOCUMENTS

| | | | |
|---|---|---|---|
| 4,128,740 | 12/1978 | Graziano. | |
| 4,369,520 | 1/1983 | Cerny, Jr. et al. | 455/52 |
| 4,545,075 | 10/1985 | Miller et al. | 359/145 |
| 4,704,734 | 11/1987 | Menich et al. | 455/33 |
| 4,916,460 | 4/1990 | Powell | 343/853 |
| 5,067,173 | 11/1991 | Gordon et al. | 359/152 |
| 5,159,479 | 10/1992 | Takagi | 359/174 |

FOREIGN PATENT DOCUMENTS

| | | |
|---|---|---|
| 1141437 | 2/1983 | Canada. |
| 0359535 | 3/1990 | European Pat. Off.. |
| 0143854 | 11/1980 | Japan .................. 359/145 |
| 0205834 | 11/1984 | Japan .................. 359/145 |
| 4048832 | 2/1992 | Japan .................. 359/145 |

Primary Examiner—Richard E. Chilcot, Jr.
Assistant Examiner—K. Negash
Attorney, Agent, or Firm—Victor F. Lohmann, III

[57] ABSTRACT

A base station in a cellular communications system is connected to a plurality of remote cellular sites by a communications link having a base terminal coupled to a remote terminal by two optical fibers. The base terminal receives RF downlink channels from the base station and optically transmits the RF channels as a non-overlapping composite signal to the remote terminal on a first fiber. The RF downlink channels are individually recovered at the remote terminal and distributed to designated cell sites. The remote terminal also functions to receive RF uplink channels from the cell sites and optically transmit the RF channels as a non-overlapping composite signal to the base terminal on a second fiber. The RF uplink channels are indivicually recovered at the base terminal and forwarded to the base station.

19 Claims, 12 Drawing Sheets

FIBER OPTIC ANTENNA REMOTING FOR MULTI-SECTOR CELL SITES

FIELD OF THE INVENTION

The present invention relates to mobile cellular communication systems and, more particularly, to a communications link between a base station and remote cell sites.

BACKGROUND OF THE INVENTION

In a cellular mobile communication system, the coverage area is divided into a number of cell sites each having antennas and associated equipment for transmitting and receiving signals. A base station controls the cells through an interconnecting network of high speed data and voice links between the cells and the base station. As traffic increases, a large cell may be split into smaller cells, thereby requiring additional high speed links to complete the network.

As indicated by Lee in "Mobile Cellular Telecommunications Systems," McGraw-Hill Book Company, pp. 337–354 (1989), either T1 lines, 800-MHz radio links, or microwave radio links may be used between the base station and cells.

In the cellular mobile phone system disclosed by Ehrlich et al. in "Advanced Mobile Phone Service: Cell Site Hardware," Bell System Technical Journal, Vol. 58, No. 1, pp. 153–199 (1979), a data bank is installed at each end of the T1 carrier. The data bank converts 20 voice channels along with system control data into a 1.54-Mbps data stream for transmission by a T1 cable. At the receiving end, the voice channels are demultiplexed and then sent to the radio frame for final radiation by an antenna.

In a 6-sector site supporting 90 radio channels (15 radio channels per sector), for example, four and one-half T1 cables are required for each direction. Disadvantageously, the use of T1 lines creates the possibility of service interruptions to the cellular mobile service provider since T1 lines are usually leased from telephone companies and are thereby subjected to rearrangements by the telephone company.

A microwave link operates similarly to the T1 cables, except that the T1 cables are replaced by a modulated microwave carrier and free space is used as the transmission medium. Although microwave links have the capacity to transmit as many as 900 channels, the links are subjected to the constraints of frequency coordination and outage due to multipath.

The frequency bands assigned to cellular mobile phone service are 824 MHz to 849 MHz for mobiles and 869 MHz to 894 MHz for land. The 25-MHz bandwidth is divided into two equal sets and awarded to two competing service providers in each area. Each 12.5 MHz bandwidth is divided into 416 channels with a bandwidth of 30 KHz. The total number of channels is divided into 21 channel-sets for frequency reuse. In each set, adjacent channels are spaced 20 channel-bandwidth apart to reduce adjacent channel interference. For instance, in a six-sector cell site, six different channel-sets are used. Though all channel frequencies are distinct, they nevertheless occupy the same 12.5 MHz bandwidth.

OBJECTS OF THE INVENTION

It is an object of the present invention to overcome the aforementioned disadvantages of the prior art.

It is a further object of the present invention to provide a fiber optic repeater link for multi-sector mobile radio applications.

It is a further object of the present invention to provide such a repeater link to enhance service quality by providing centralized diversity management of all cells.

SUMMARY OF THE INVENTION

The present invention relates to a communications link interconnecting a base station to a plurality of remote antenna cells. The link comprises a base station transceiver means at said base station for optically transmitting a plurality of RF transmit signals on a downlink optical channel, and for receiving an optical uplink channel. The link further comprises an optical pathway means coupled to said first transceiver means for optically transporting said optical downlink channel, and for delivering said optical uplink channel to said first transceiver means. A remote cell transceiver means coupled to said optical pathway means detects the RF transmit signals on said optical downlink channel and forwards said detected transmit signals to antenna cells for transmission, and generates said optical uplink channel representing a plurality of RF receive signals each received from a respective one of said remote cells.

DETAILED DESCRIPTION OF THE PREFERRED EMBODIMENTS

Figure 1:
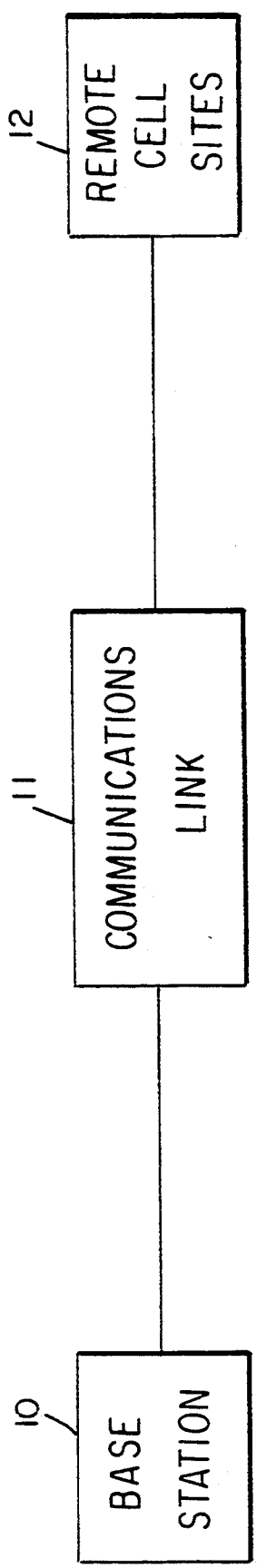
FIG. 1 is a network diagram of the cellular communication system according to the present invention.

FIG. 1 illustrates a system block diagram of a cellular communications system according to the present invention. The present invention relates specifically to the communications link 11 between base station 10 and a plurality of remote cell sites 12. The base station 10 is connected externally to a local exchange network, and provides centralized management for controlling communications with the plurality of remote cellular sites 12. Each of the cell sites is accessible by mobile cellular subscribers.

Figure 2:
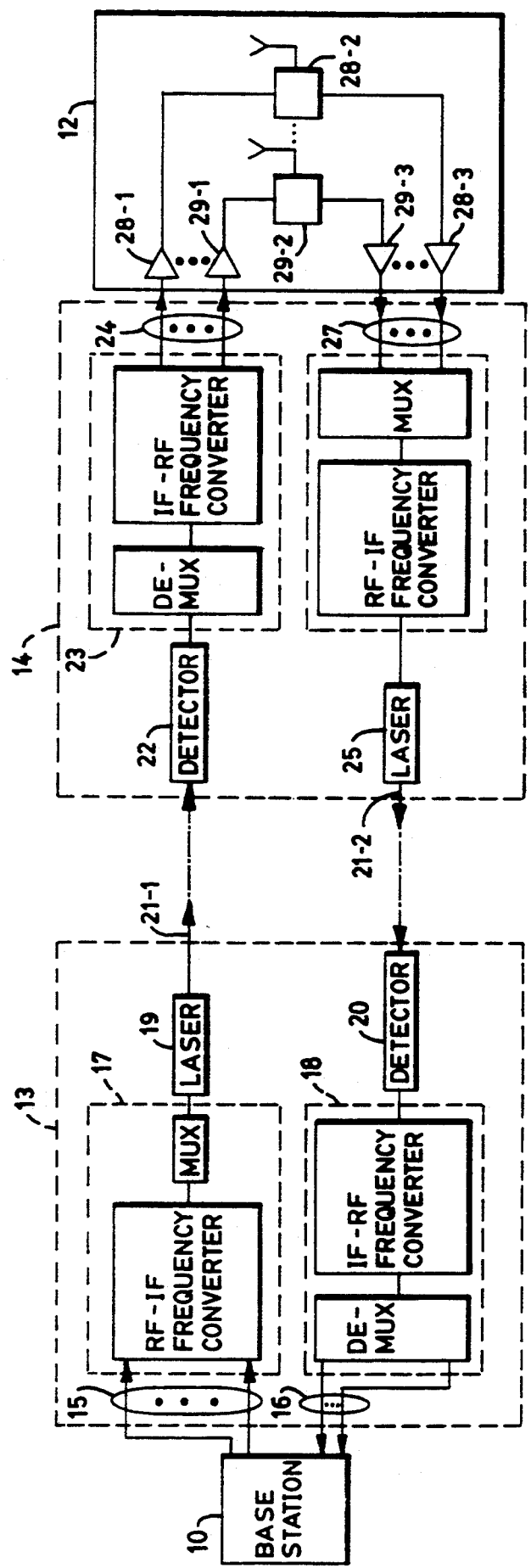
FIG. 2 is an exemplary system diagram of a fiber optic antenna remoting network for a six sector cell site.
Figure 12:
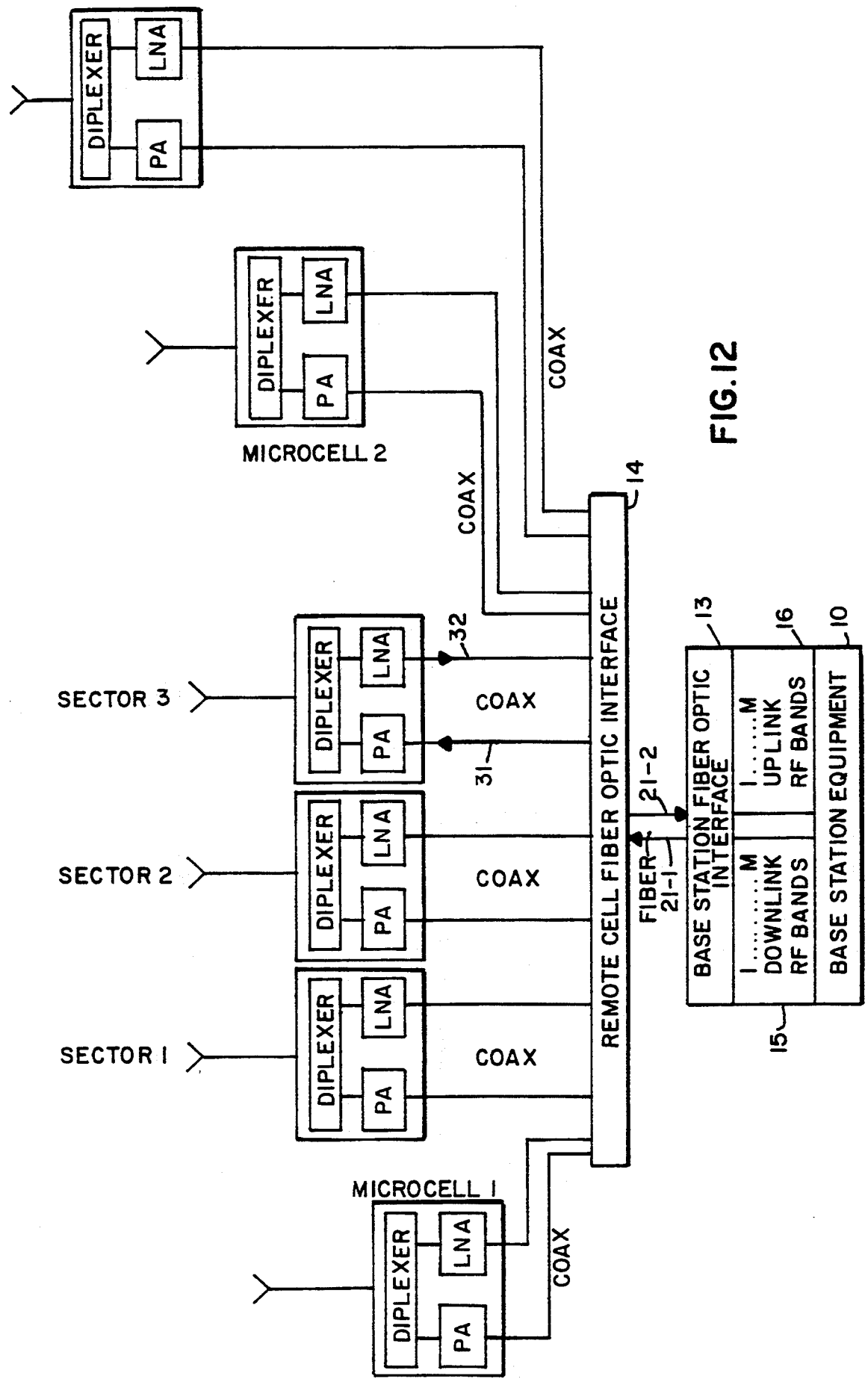
FIG. 12 illustrates a cellular communication system having three microcell sites and a single three-sector site.

The remote cell sites 12 may have N sectors, with N preferably equalling 1, 3, or 6, or may include a number of multi-sector cells and single-sector microcells. Preferred embodiments of the present invention are shown in FIGS. 2 and 12, and will be discussed in further detail below. FIG. 2 illustrates a multi-sector cell site, and FIG. 12 illustrates a cellular system with a three-sector site and three microcell sites.

The communication link 11 includes a base terminal adaptably coupled to the base station 10, a remote terminal adaptably coupled to the remote cellular sites 12, and a first and second optical fiber for providing bidirectional optical communication between the base terminal and remote terminal.

The base terminal receives downlink RF signal channels from base station 10, performs signal processing on the channels, and transmits the downlink channels over the first optical fiber to the remote terminal where the channels are further processed and appropriately distributed to the cellular sites. The remote terminal receives uplink RF signal channels from the cellular sites, performs signal processing on the channels, and transmits the uplink channels over the second optical fiber to the base terminal where the signal channels are further processed and forwarded to base station 10.

As used herein, downlink refers to the signal path from base station 10 to remote cell site 12, and uplink refers to the signal path from remote cell site 12 to base station 10.

The uplink and downlink frequency bands used by all sectors and all cells are the same. Consequently, it is necessary that the M total frequency bands used by all cell sites and sectors be converted to M unique non-overlapping intermediate frequency bands in order for all of the uplink and downlink channels to be simultaneously transmitted on their respective optical fibers.

At both the base terminal and remote terminal of link 11, the aforementioned intermediate frequency (IF) bands are combined together and used to modulate a laser. The modulated light output of the laser is transmitted by the appropriate optical fiber to the opposite terminal of the communications link 11. At this opposite terminal of link 11 where the transmitted optical signal is received, the composite IF optical signal is photodetected and demultiplexed in a frequency conversion process to reproduce and separate the original M input frequency bands. If the receiving terminal is the remote terminal, the detected frequency bands correspond to downlink channels which are distributed to the cell sites 12. Conversely, if the receiving terminal is the base terminal, the detected frequency bands correspond to uplink channels which are forwarded to the base station 10.

FIG. 2 is a block diagram of a cellular communications system illustrating the principles of the present invention. Functionally equivalent systems and components between FIGS. 1 and 2 are designated with the same reference numbers.

The transmission of downlink channels from base station 10 to the remote cell sites 12 commences with the base station 10 forwarding a plurality of RF downlink signals 15 to downlink base station interface 17 in base terminal 13. Since the downlink RF signals occupy the same bandwidth, each RF downlink signal is frequency converted to a respective non-overlapping intermediate frequency (IF) signal. The IF signals are then combined to form a composite signal which modulates a laser 19 to produce an optical downlink channel transmitted on fiber 21-1.

At the remote terminal 14 coupled to fiber 21-1, the optical downlink channel is photodetected by detector 22 and forwarded to downlink remote cell interface 23. The interface 23 functions to recover each IF signal from the detected composite signal and downconverts the individual IF signals to a plurality of RF signals 24, each representing one of the RF signals originally transmitted from base station 10.

Each of the RF signals 24 is then forwarded to a respective one of the cell sites 12 where radio interface units are located. Each radio interface unit consists of an antenna operating in a diplax mode, a power amplifier (PA) coupled to receive a downlink RF signal from a respective remote cell interface and forward the amplified signal to the antenna, and a low noise amplifier (LNA) adapted to receive an uplink RF signal from the antenna and couple the preamplified signal to a respective remote cell interface.

Accordingly, one of the RF downlink signals 24 is amplified by PA 28-1 and transmitted by antenna 28-2. Although two cell sites are shown in FIG. 2, with one having radio equipment 28-1,2,3 and the other having radio equipment 29-1,2,3, it should be obvious to those skilled in the art that there may be a plurality of such cell sites.

During signal reception when mobile subscribers are attempting to communicate with base station 10, the antenna 28-2 receives an RF uplink channel transmitted by the subscriber. The plurality of RF uplink channels received by the antenna units are each amplified by LNA 28-3 and then forwarded as RF uplink channels 27 to remote terminal 14.

At remote terminal 14, the uplink channels 27 are forwarded to uplink remote cell interface 26. The interface 26 frequency converts each RF signal to a respective IF band, combines the non-overlapping IF signals into a composite electrical signal, and forwards the composite signal to laser 25 for optical transmission.

Laser 25 transmits the composite electrical signal as an uplink optical channel over fiber 21-2 to base terminal 13. The optical uplink channel is photodetected by a detector 20 and forwarded to an uplink base station interface 18. The interface 18 separately recovers each IF signal from the detected composite electrical signal, and frequency converts each IF signal to a respective uplink RF signal corresponding to one of the uplink RF signals received by an antenna 28-2. The plurality of RF uplink signals 16 are then forwarded to base station 10.

Figure 3A:
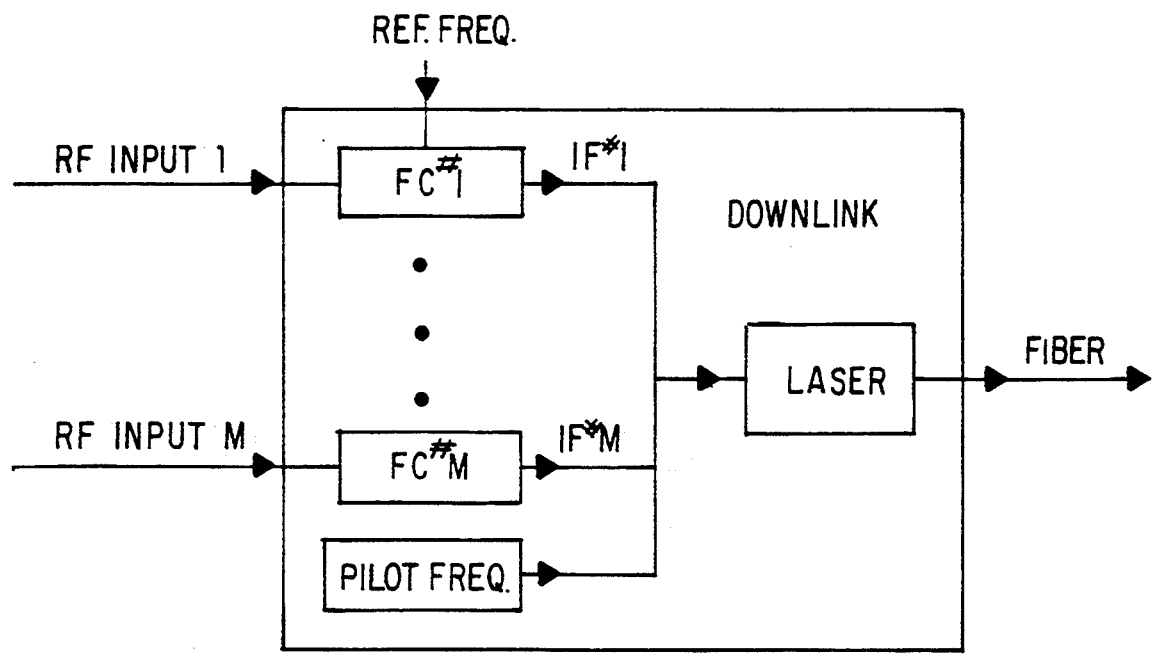
FIGS. 3(A)–3(B) are a further detailed block diagram of the interface in the base station terminal of FIG. 2.
Figure 3B:
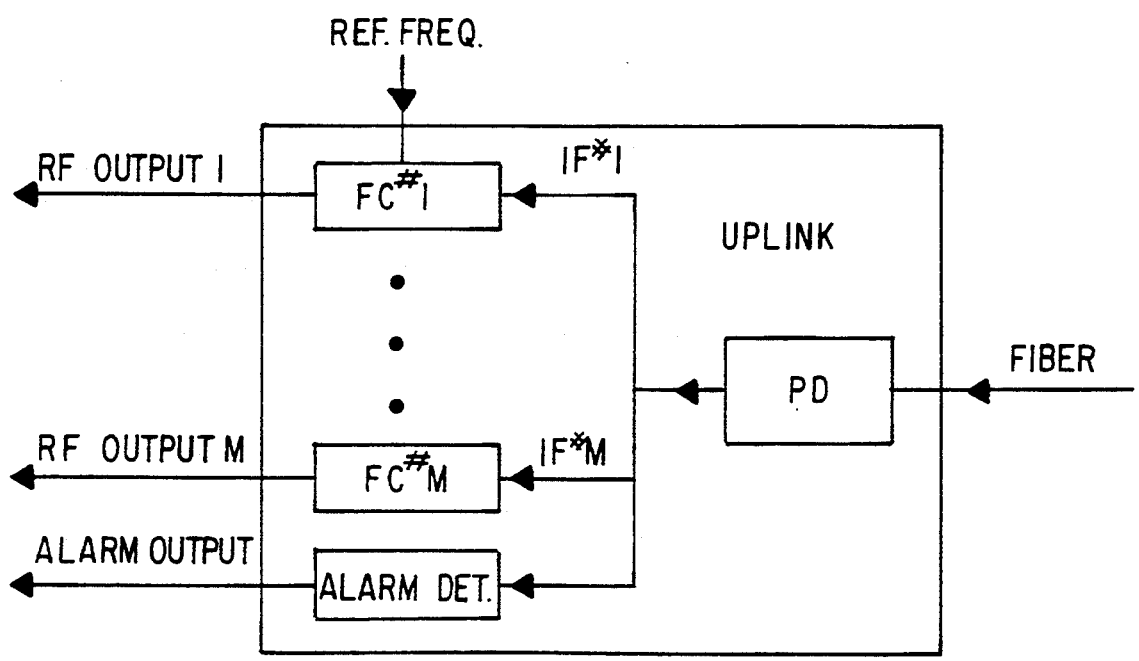
Figure 4A:
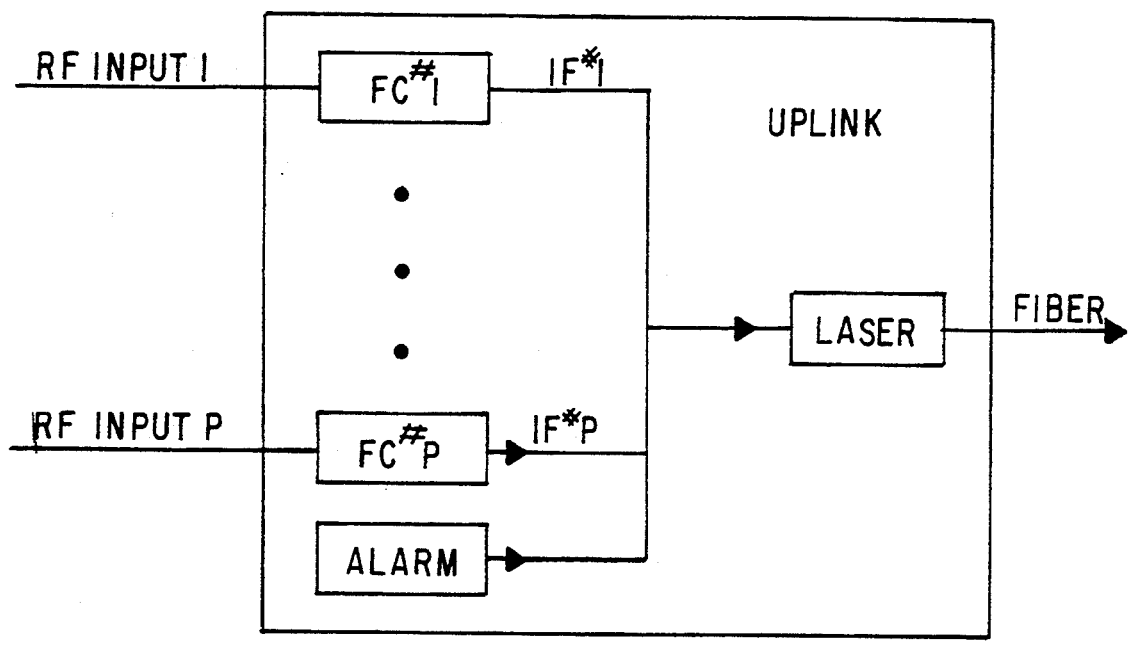
FIGS. 4(A)–4(B) are a further detailed block diagram of the interface in the remote terminal of FIG. 2.
Figure 4B:
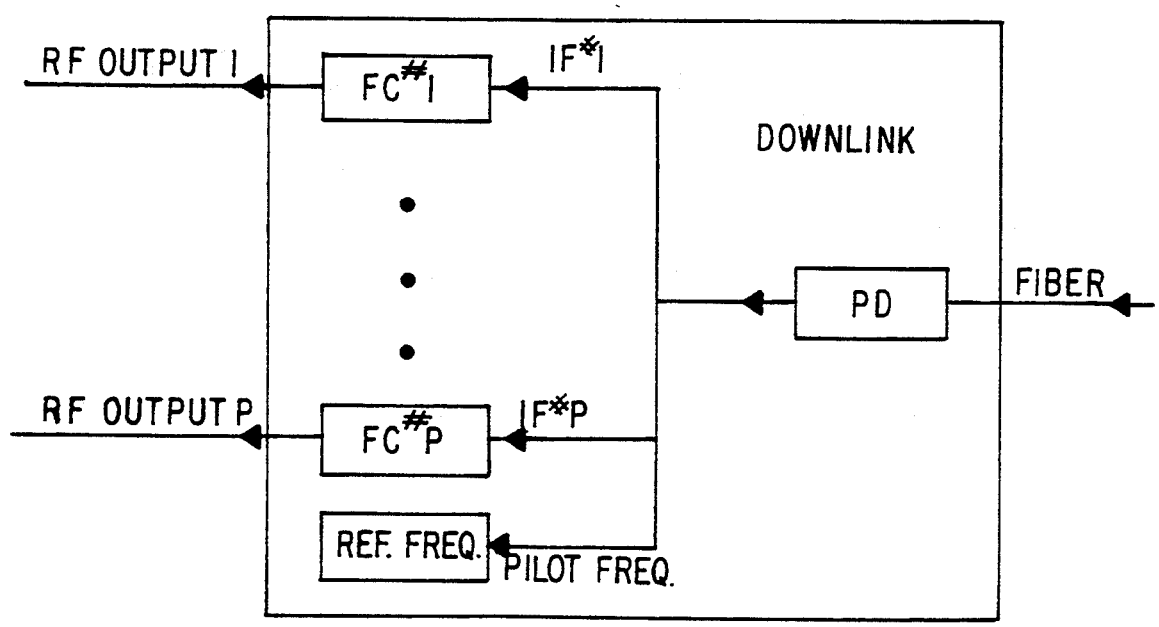

FIG. 3A and 3B show the signal processing which occurs at the base terminal 13 for the downlink and uplink channels, respectively, while FIGS. 4A and 4B show the signal processing which occurs at the remote terminal 14 for the uplink and downlink channels, respectively.

In accordance with the system shown in FIG. 2, an experimental fiber optic system was designed to connect a remote 6-sector site with a base station separated by about 10 Km. The link can also be used to connect a base station to a remote hub which serves as the center of six remote microcells linked to the hub by short runs of coaxial cables.

PERFORMANCE ANALYSIS

The system performance of the aforementioned experimental communications link was conducted and is described below.

At the base terminal of communications link 11, six RF signals each converted to a respective IF band are multiplexed with an additional IF pilot frequency using a power combiner. The composite IF signal is optically transmitted over a fiber using a laser transmit module. The module includes a cascade of an L7108 low pass filter, dual UT01024 amplifiers, and a Mitsubishi DFB laser FU-45SDF-3.

The aforementioned pilot frequency serves two functions. It is used to transmit control signals for the remote cell site equipment, and at the same time it is used to lock the remote cell site reference oscillator to exactly the same frequency as that used in the base station to ensure that there is no frequency error due to the frequency conversion processes. If the control signal is digital, bi-phase shift-keying (BPSK) or some other digital modulation method can be used to modulate the pilot signal with the control signal.

Figure 5:
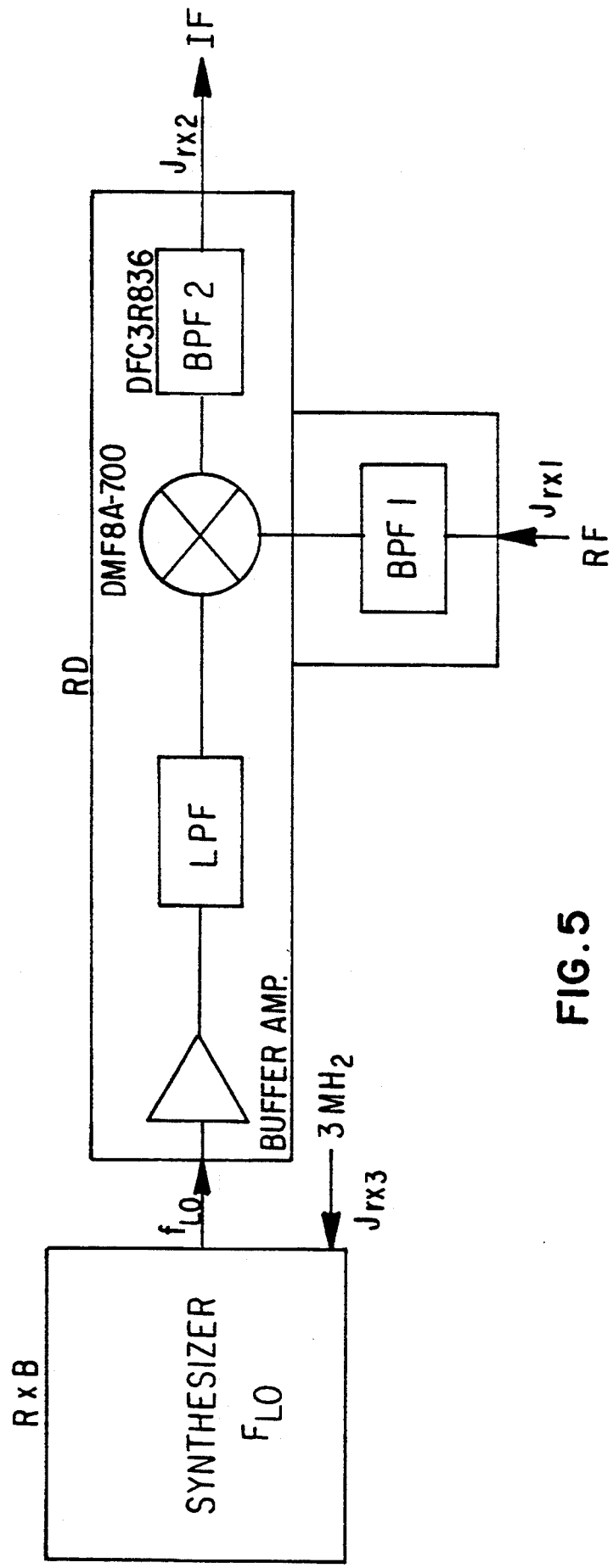
FIG. 5 shows a frequency conversion unit at the base terminal of FIG. 2.

FIG. 5 illustrates a representative frequency conversion unit at the base terminal for converting an RF downlink signal to an IF channel.

A synthesizer block 41 receives a reference frequency (3 MHz in the exemplary system) and is responsive to a user-provided switched data input for generating a desired local oscillator frequency $f_{LO}$. A frequency converter 42 receives the $f_{LO}$ signal and an RF signal as inputs and generates a corresponding IF signal at an output.

As shown, $f_{LO}$ is processed by a series cascade of a buffer amplifier and low pass filter before being applied to a mixer DMF8A-700. The RF signal is processed by a bandpass filter and also forwarded to the mixer. The output of the mixer is then bandpass filtered by component DFC 3R836 to produce the IF channel which is forwarded to the power combiner for multiplexing.

Intermediate frequencies used in the downlink do not have to be the same as those used in the uplink. To take advantage of the large available bandwidth in a fiber optic RF link, the IF's are selected to produce minimum intermodulation products. Identical local oscillator frequencies $f_{LO}$ are preferably used for the frequency down-conversion and frequency up-conversion for each IF band at the two ends for each link in order for the repeater links to appear as transparent with a one-to-one correspondence between the input connectors and output connectors. The pilot signal is a 664.5 MHz signal generated from a 3 MHz reference signal using a frequency synthesizer.

At the remote terminal, the optical downlink channel is received by an S/N 951E8177 photodetector and processed by a cascade of an L7108 low pass filter and dual UT02033 amplifiers. The detected IF composite is distributed by a DS808-4 power divider to individual frequency conversion units where respective RF signals are generated for distribution to remote cell sites.

Figure 6:
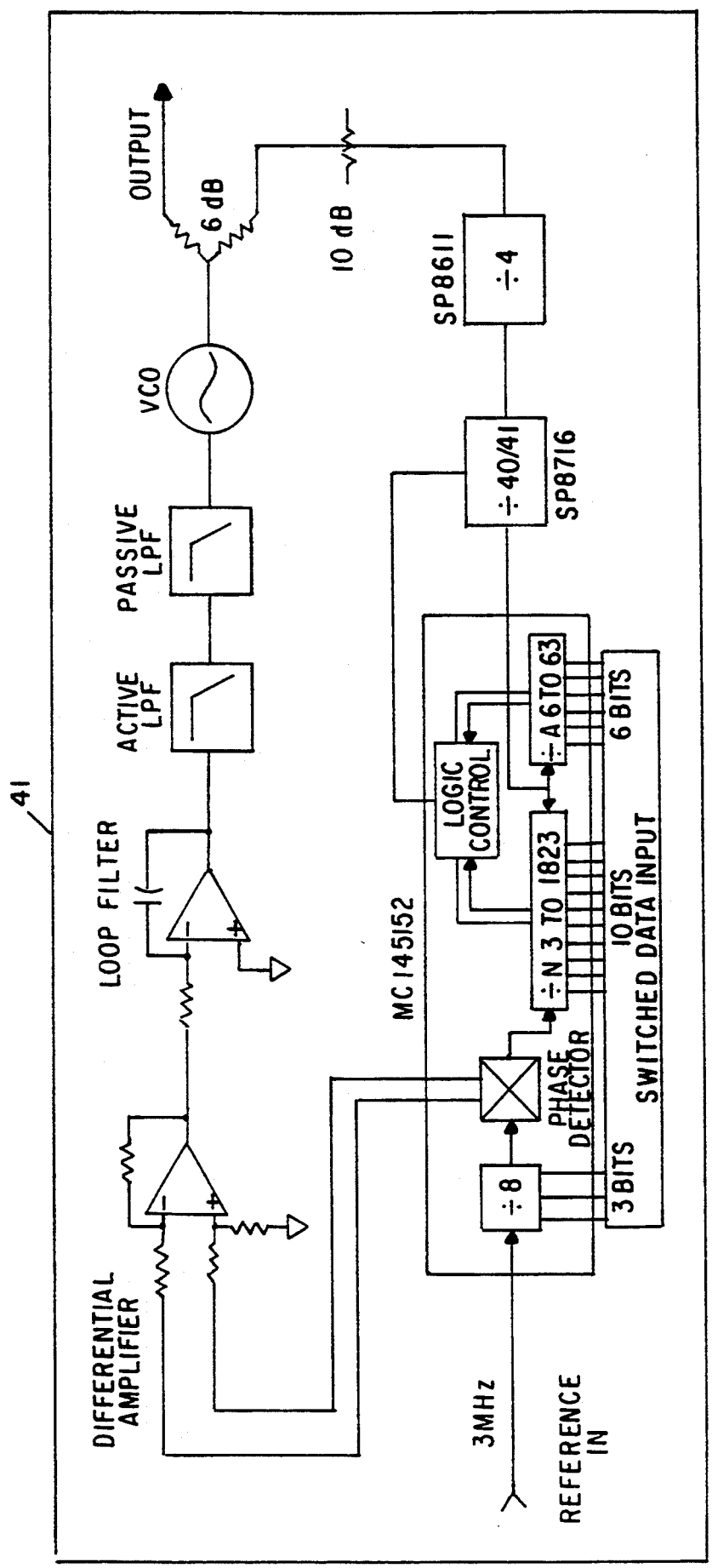
FIG. 6 is a detailed circuit diagram of the synthesizer block in FIG. 5.

FIG. 6 shows a block diagram of the synthesizer 41 in FIG. 5 utilizing a Motorola synthesizer chip MC 145152.

Figure 7:
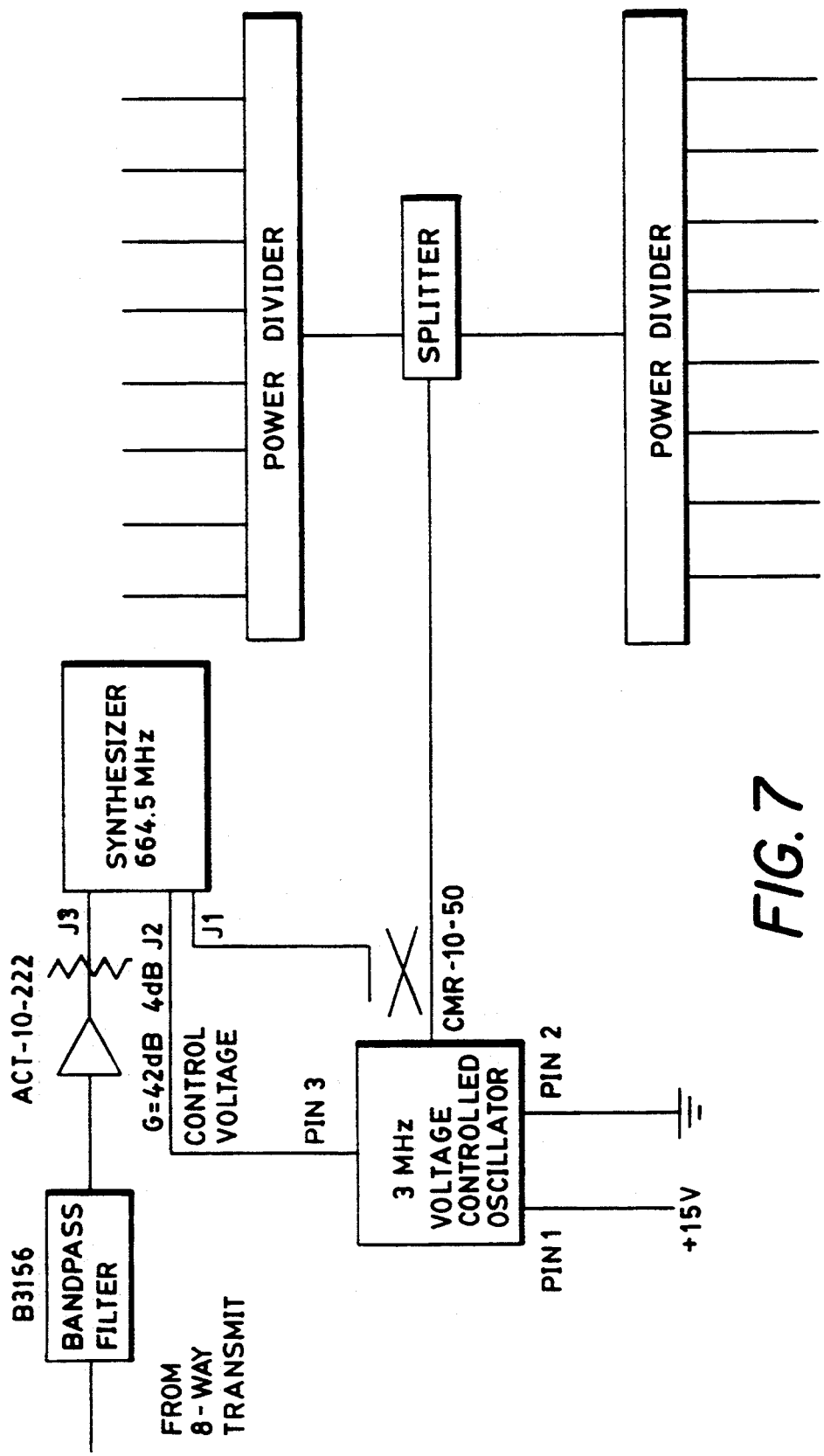
FIG. 7 is a block diagram of the circuitry for generating and distributing a reference frequency in the remote terminal.

FIG. 7 shows the componentry used at the remote terminal for generating a 3 MHz reference frequency for distribution to individual frequency conversion units where the separate IF channels are downconverted to respective RF signals. The input to bandpass filter B3156 is the IF pilot signal transmitted from the base terminal. The reference frequency appears on line 60 and is distributed by components THV-50 and DS-309 to the individual frequency conversion units for each IF signal.

With respect to the uplink path from the remote terminal to the base terminal, each RF signal received from a respective cell site is frequency converted to a respective IF channel and then multiplexed with other RF signals by a DS-808-4 power combiner.

Besides the IF signal channels, an additional IF signal accompanies the other IF bands. This additional IF signal is used to transmit remote cell site equipment status or alarm to the base station for monitoring. If the status or alarm signal is digital, BPSK modulation is preferably used.

The composite IF electrical signal is processed by a laser transmit module comprising an L7108 low pass filter, a UT01024 amplifier, a cascade of two UT01004 amplifiers, and an Ortel laser. The output of the Ortel laser is an optical uplink signal that is placed on a fiber medium for transport to the base terminal.

At the base terminal, the optical uplink signal is processed by a detector module comprising an Epitaxx 75FC SLR Photodetector, a first UT01024 amplifier, an L7108 low pass filter, and a second UT01024 amplifier. The detected IF composite uplink electrical signal is forwarded to an 8-way power divider which distributes the IF composite signal to separate frequency conversion units where the RF channels originally received by the remote sites are recovered along with the alarm signal. The individually recovered RF channels are then forwarded to the base station for further distribution.

Although specific components have been identified above in relation to the constructed communication system, it should be obvious to those skilled in the art that the signal processing functions performed at the base and remote terminals may be implemented by other components known to those skilled in the art. These functions include RF-to-IF and IF-to-RF frequency conversion, filtering, power combining/dividing, and optical transmission/detection. Accordingly, these specific components in FIGS. 5-7 should not serve as a limitation of the present invention.

1. Gain and Noise Figure of Fiber Optic Link

Fiber optic links have been described in terms of optic parameters by a number of authors, including D. Tang in "Design and Performance of a Fiber-Optic Video Distribution System Using BPSK Microwave Subcarriers," IEEE Journal on Selected Areas in Communications, Vol. 8, No. 7, pp. 1304-1312, September 1990; D. Fye in "Design of Fiber Optic Antenna Remoting Links for Cellular Radio Applications," 40th Vehicular Technology Conference, May 1990, pp. 622-625; Hara et al. in "The Use of an Optical Power Combiner for Multiplexing Multiple Television Sources in a Single Fiber Optic System," IEEE Trans. Cable Tel., Vol. CATV-4, No. 2, pp. 49-55, April 1979; and Ortel Corporation in "rf/Microwave Fiber Optic Link Design Guide," April 1989.

However, when an rf fiber optic link is connected between rf components such as amplifiers, mixers, and filters, it is more convenient to treat the entire rf fiber optic link, including laser, fiber, and photodetector, as one rf component, and describe its performance in terms of noise figure, gain, and intercepts. Thus, cascading formulas can be used to predict overall system performance as well as to identify the critical components limiting overall system performance.

Intensity modulation of a laser by an rf signal is achieved by superimposing an rf current on a dc bias current. Different lasers require different magnitudes of rf current to achieve full intensity modulation, although for a given laser the intrinsic rf power required for full modulation is fixed, and can be approximately calculated by multiplying the rf resistance of the laser by the square of the rms value of the rf current. However, the actual rf power required at the accessible terminal will generally be much higher than the intrinsic rf power due to mismatch and dissipative losses in the external matching circuits used between the laser terminal and the terminal accessible to rf connection.

For analysis purposes, the following variables are used:

$P_{pk}$ = maximum instantaneous laser optical output power,
$P_o$ = average laser optical output power,
m = laser intensity modulation index,
$m = (P_{pk} - P_o)/P_o$,
and $$(P_{pk} - P_o) = \text{peak optical } ac \text{ power}$$
$$= mP_o.$$

Figure 8:
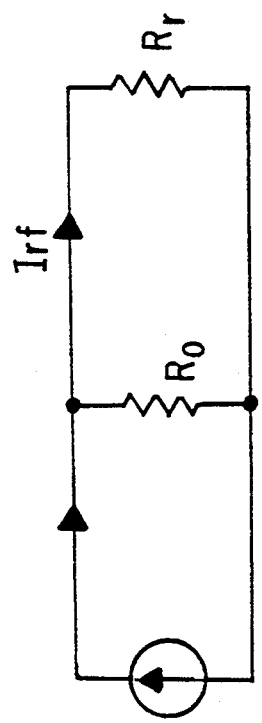
FIG. 8 shows an equivalent circuit of a fiber optic link.
Figure 8:
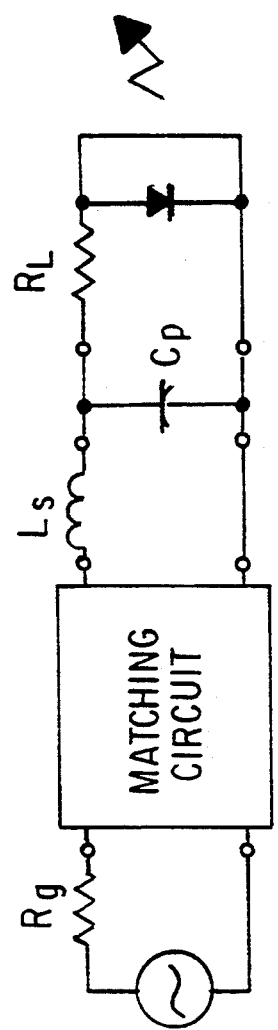

Since the rf signal is carried as an intensity envelope on the optical power, a photodetector is used to recover the rf signal. Consequently, any rf analysis of an optical link must include the characteristics of a photodetector. FIG. 8 shows an equivalent circuit of a fiber optic link wherein a laser is connected to a photodetector via an optic fiber. Since a photodetector is basically a current source, the detector produces a current of rP when illuminated by an optical power P, where r is the responsivity (amp/watt) of the photodetector.

If $$I_{rf} = \text{peak } rf \text{ current from photodetector in } R_r,$$
$$= (rMP_o/L_f)(R_o/(R_o + R_r)),$$

then $$(P_{rf})_r = \text{received } rf \text{ power}$$
$$= (1/2)[rmP_o/L_f]^2[R_o + R_r)]^2R_r,$$

where
$L_f$ = fiber loss,
r = photodetector responsivity, amp/watt, typically 0.9 amp/watt, and
$R_r$ = photodetector terminating load resistance.

Since $P_o/L_f$ is the average optical power received by the photodetector, and $$I_{dc} = \text{average } dc \text{ current in } R_f$$
$$= (rP_o/L_f)(R_o/(R_o + R_r))$$

the intensity modulation index, m, can be calculated from the measured values of rf power and the average dc current dissipated in $R_r$ due to the photodetector:

$$M = (1/I_{dc})(2P_{rf}/R_r)^{\frac{1}{2}}$$

If we define $$(P_{rf})_m = rf \text{ power required at the laser } rf \text{ input for } m = 1,$$
$$= [(I_{dc})^2 R_r/2]$$

then for any rf input power at the laser, $(P_{rf})$, the intensity modulation index is given by $$m = [P_{rf}/(P_{rf})m]^{\frac{1}{2}}$$

The measured $(P_{rf})_m$ includes losses due to mismatch and dissipation in components.

The overall gain of the fiber optic link can thus be calculated as follows:

$$G = (P_{rf})r/P_{rf}$$
$$= [1/2(P_{rf})m] [rP_o/L_f]^2[R_o/(R_o + R_r)]^2 R_r$$

The noise figure F at the input of the link is defined as the ratio of the signal to noise quotients at the input and output:

$$F = (S_i/N_i)/(S_o/N_o)$$

where
$S_o = GS_i$
$N_i = kT$
$N_o = P_{nL} + P_{nP} + kT.$
$P_{nL}$ = output noise due to laser relative intensity noise,
$P_{nP}$ = output noise due to photodetector, consisting of shot noise and noise due to dark current,
kT = receiver thermal noise.

Laser intensity noise is the noise due to the fluctuation of output optical power and is defined in the Ortel Corporation design guide, Supra, as $$RIN = \text{relative intensity noise, dBc/Hz}$$
$$= <\Delta P>^2/P_o^2.$$

Thus, $$P_{nL} = (RIN) (rP_o/L_f)^2(R_o/(R_o+R_r))^2 R_r.$$

The photodetector noise consists of shot noise and dark current noise. The dark current noise is usually negligible, and the shot noise is given by Tang, Supra, as $$P_{np} = 2q(rP_o/L_f)(R_o/(R_o+R_r))^2 R_r$$

where q = electron charge, $1.6 \times 10^{-19}$.

Substituting the expressions for G, $P_{nL}$, and $P_{np}$ into the equation for F, we obtain $$F =$$

$$2(P_{rf})m \left[ \frac{(RIN)\left(\frac{rP_o}{L_f}\right) + 2q}{\left(\frac{rP_o}{L_f}\right)kT} + \frac{1}{\left(\frac{rP_o}{L_f}\right)^2 \left(\frac{R_o}{R_o + R_f}\right)^2 R_r} \right]$$

In order to obtain high fiber optic link gain and low noise figure, $(P_{rf})_m$ should be kept small, i.e., low loss efficient reactive matching circuits should be used at the laser rf input.

Figure 9:
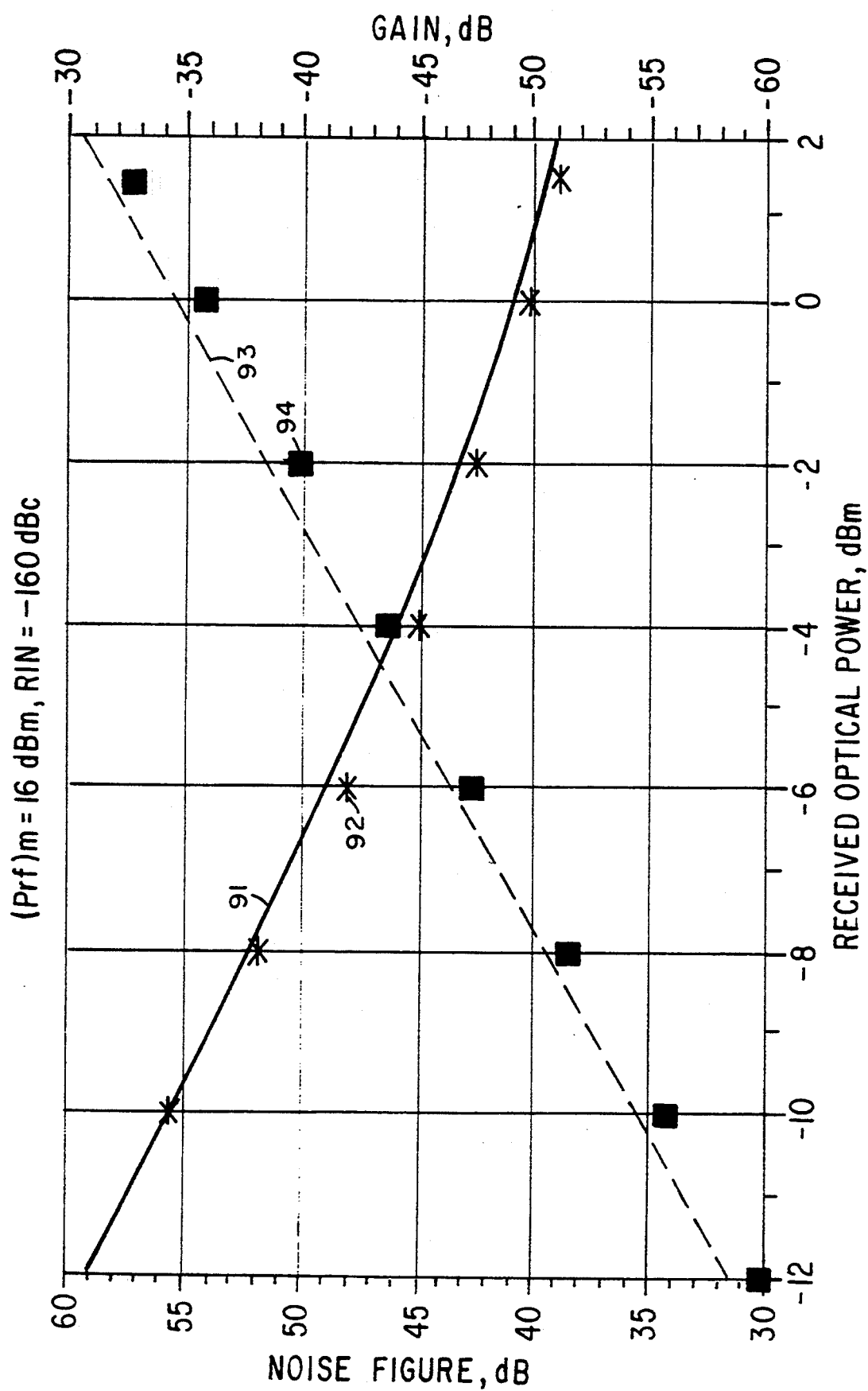
FIG. 9 graphically compares noise figure and gain of a fiber optic link versus received optic power.

FIG. 9 shows the calculated and measured noise figure and gain of a fiber optic link using Mitsubishi DFB laser FU-45SDF-3, where $(P_{rf})m=16$ dBm, RIN$=-160$ dBm. Both are plotted versus the received optical power from $-12$ dBm to $+2$ dBm. Excellent agreement was obtained over the 14 dB optical power range used. Since the difference between the laser transmitted power at the sending end and the optical power received by the photodetector at the receive end represents the transmission loss due to optical fiber, both the noise figure and gain of a fiber optic link are functions of transmission distance. Overall system design should be based on the original power available at the received site.

2. Selection of Intermediate Frequencies

The six identical 25-MHz frequency bands from the six sectors are converted to six different intermediate frequency bands for transmission by the fiber. Due to the non-linearity of the laser, in addition to intermodulation products between frequencies within the same sector, additional intermodulation products between frequencies in different IF bands will occur. The intermodulation products and harmonics due to frequencies in different IF bands can be minimized by judiciously choosing the center frequencies of these IF bands such that these between-band intermodulation products and harmonics do not fall on any IF band of interest.

The intermediate frequency (IF) ranges are chosen from 70 MHz to 700 MHz due to practical circuit considerations. Since the IF range covers a decade, both second order and third order intermodulation products, as well as second and third harmonics, were considered in the IF selection process. Intermodulation products (IMP) higher than the third were not considered.

If there are M equally spaced channels per sector with a frequency spacing of $\Delta f$, then the second order products cover a bandwidth $(2M-2)\Delta f$. Similarly, the third order products will cover a bandwidth $(3M-3)\Delta f$. The IMP examined are $(F_1\pm F_2)$, $2F$, $(\pm 2F_1\pm F_2)$, $(F_1\pm F_2\pm F_3)$, and $3F$. When $M=12$, the maximum number of IMP is equal to 12 for each $(F_1\pm F_2)$ term, 6 for each $(\pm 2F_1\pm F_2)$ term, and 108 for each $(F_1\pm F_2\pm F_3)$ term. The distribution of the triple beat terms is in the shape of a bell, with the maximum value of 108 in the center and gradually decreases to zero at the band edges.

A computer program was written to select a set of IF frequencies for minimum intermodulation products within any given IF bandwidth of 14 MHz, which is the bandwidth assigned to the B systems. For non-interference, the center frequency of a desired IF band must be at least 21 MHz away from that of any second order product, and 28 MHz away from that of any third order product.

The most important criteria used in selecting the IF bands is that the center frequencies of all IMP, up to the third, should not fall within a 7 MHz bandwidth measured from the center frequency of any IF band. If the intermodulation products falls within a desired IF band, the extent of the overlap is calculated and the number of total intermodulation products in dB, 10log(N), including those due to in-band channels, were calculated at the two sector band edges and the center frequency. Results indicate that contributions due to second order products are insignificant, only third order contributions are considered in the following calculations. For a system with 12 channels per sector, the maximum number of third order products, mainly due to triple beats, is found to be 23.6 dB for the downlink and 22.6 dB for the uplink. If the six IF bands were uniformly spaced, the total IMP will be 32.9 dB. If there were only one sector, the IMP will be 17.4 dB as indicated by Erling Sunde in "Communications Systems Engineering Theory," John Wiley and Sons, Inc., 1969. For $M_1$ channels per sector, add $20[\log(M_1/12)]$ to the above number in dB, since the total triple beat is proportional to the square of the number of channels. The third order intermodulation performance can be approximately predicted from the third order intercepts at the output the link and the total number of third order intermodulation products. The carrier to total third order IM products can be calculated as follows:

$$C/(TB) = (P_s) - (TB)$$
$$= -2(P_s) + 2[(IP_3) - G_o] - 10\log(N) - 6.$$

where
$(IP_3)$ = third order intercept at the output of the link, in dBm
$(P_s)$ = input signal power per channel,
$G_o$ = end-to-end link gain, in dB
$(TB)$ = power level of total third order IM products, in dBm
$N$ = total number of third order intermodulation products
  = $10\log(3M^2/8)$, M is the number of equally spaced carriers.

The input carrier-to-noise ratio is:

$$C/N = (P_s) - [-174 + NF + 10\log(BW)].$$

where NF=input noise figure, in dB.

Once C/TB and C/N is determined for an input power level, C/TB decreases 2 dB for each dB increase in C/N.

3. Design Considerations and Measured Performance

The overall system performance can be predicted by the use of cascading equations. The overall input noise figure and third order intercept can be calculated by the following formulas:

$$F = F_1 + \sum_{n=2}^{L} \frac{(F_n - 1)}{\prod_{m=1}^{n-1} G_m}$$

$$(IP_n)^{\frac{(1-n)}{2}} = \sum_{m=1}^{M} \left( IP_{nm} \prod_{i=m+1}^{L} G_m \right)^{\frac{(1-n)}{2}}$$

where
F=overall input noise figure,
$F_n$=noise figure of nth component in the cascade.
$IP_n$=nth order intercept of the output of the system
$IP_{n,m}$=nth order intercept of the component in the cascade.
$G_m$=gain of the component in the cascade,
L=total number of rf components in the cascade.

The third order intercept of a DFB laser can be specified to be so many dB above $(P_{rf})m$. If $(P_{rf})m$ has a higher value due to losses resulting from mismatch or dissipation, then IP3 will have a proportionately higher value. Therefore, the performance of the optical link is not effected by the value of $(P_{rf})m$. However, higher values of $(P_{rf})m$ require proportionately higher input rf to achieve the same performance. This in turn requires a higher output $IP_3$ of the amplifier driving the laser if the same intermodulation performance is to be maintained. The input $IP_3$ of the laser used in the uplink is 25 dB above its $(P_{rf})m$, and that of the downlink is 22 dB.

In the following discussions, 4 dB optical transmission loss is allowed for each link. With optic transmission loss between 0.3 dB to 0.5 dB per km, the links can span a distance of about 10 km.

Figure 10:
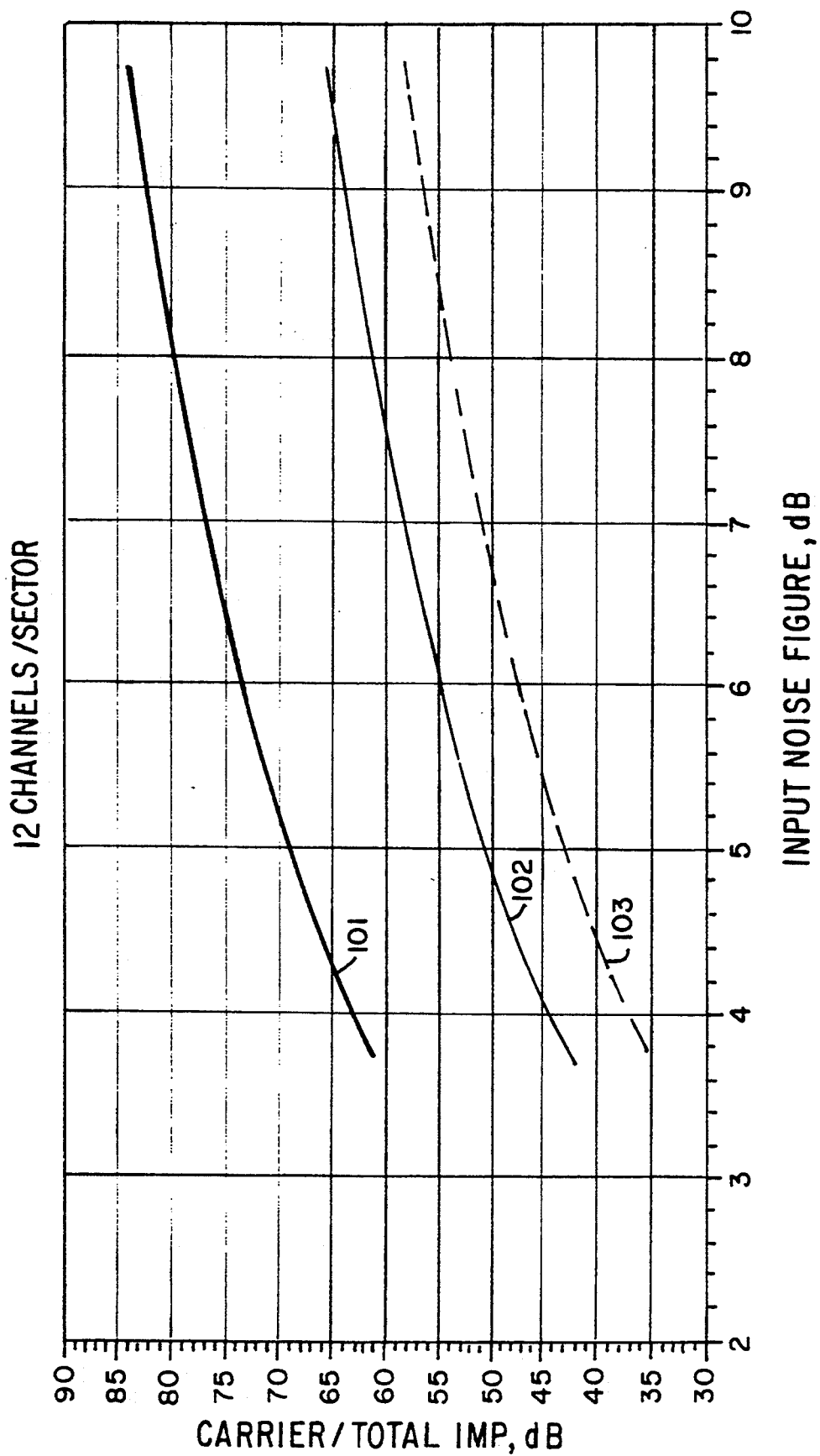
FIG. 10 is a graph showing the relationship between C/(Total IMP) and Noise Figure.

There are eighteen rf components in the uplink cascade from the input of one sector to the output of the same sector. The uplink cascade consisted of a mixer, a band pass filter an amplifier A (G=12 dB NF=6.5 dB, $IP_3$=+35 dBm), an 8-way combiner, a low pass filter, an amplifier A, an amplifier B (G=7 dB, NF=7 dB, $IP_3$=+40 dBm), an amplifier B, an optic link (including a DFB laser, RIN=−160 dBc/Hz, $(P_{rf})m$=+19 dBm, $IP_3$=+43.5 dBm at rf input, average optical $P_o$=+6 dBm, fiber loss=4 dB, and a photodetector, r=0.8 amp/watt), an amplifier A, a low pass filter, an 8-way divider, a bandpass filter, an upconverter, and a bandpass filter. Same type of mixers were used in the downconversion and upconversion. To provide interfacing flexibility, no preamplifier is included in the uplink. The calculated nominal end-to-end gain is 21 dB and the input noise figure is 29 dB. The overall output third order intercept is −4 dBm. As far as the IM performance is concerned, the most critical components are the first downconversion mixer and the amplifier immediately preceding the laser. The mixers have a nominal input $IP_3$ of 25 dBm and a conversion loss of 8 dB. However, due to the widely different IF's used the LO power being 3 dB less than optimum (14 dBm instead of 17 dBm), the actual $IP_3$ of the mixer varied between 17 dBm and 21 dBm. Thus the measured end-to-end output $IP_3$ is lower than the overall calculated link output $IP_3$ based on the nominal value of mixer $IP_3$. This was considered to be the major cause of the discrepancy between predicted results based on specifications and the measured results. The end-to-end performance in terms of input noise figure, total gain, and C/(Total IMP)(only third order IMP are included) are calculated by using the above cascading formulas with the rf specifications of all the components used in each cascade. FIG. 10 shows the trade-off between input noise figure and the C/(Total IMP) ratio for the uplink based on measured results. The heavy solid line is obtained by considering only the $IP_3$ of the laser and the values of $IP_3$ of all rf components are assumed to be infinite. The light solid line is the upper bound obtained by including $IP_3$ values of all rf components and using the best case value of the $IP_3$ (+25 dBm) of the first downconverter, and similarly the dotted line is the lower bound obtained by using the worst case $IP_3$ (+17 dBm) of the first downconverter. The numbered points indicate measured points for each of the six sectors. There is an eighteen dB degradation in C/(Total IMP) due to rf components, most of this degradation is attributed to the first downconverter, To obtain improvement and approach what the optic link can offer, mixers dynamic range must be considerably improved over what is currently available commercially. The intermodulation ratio, IMR, is 29 dB higher than the C/(Total IMP) ratio for the case of 12 channels per sector.

Figure 11:
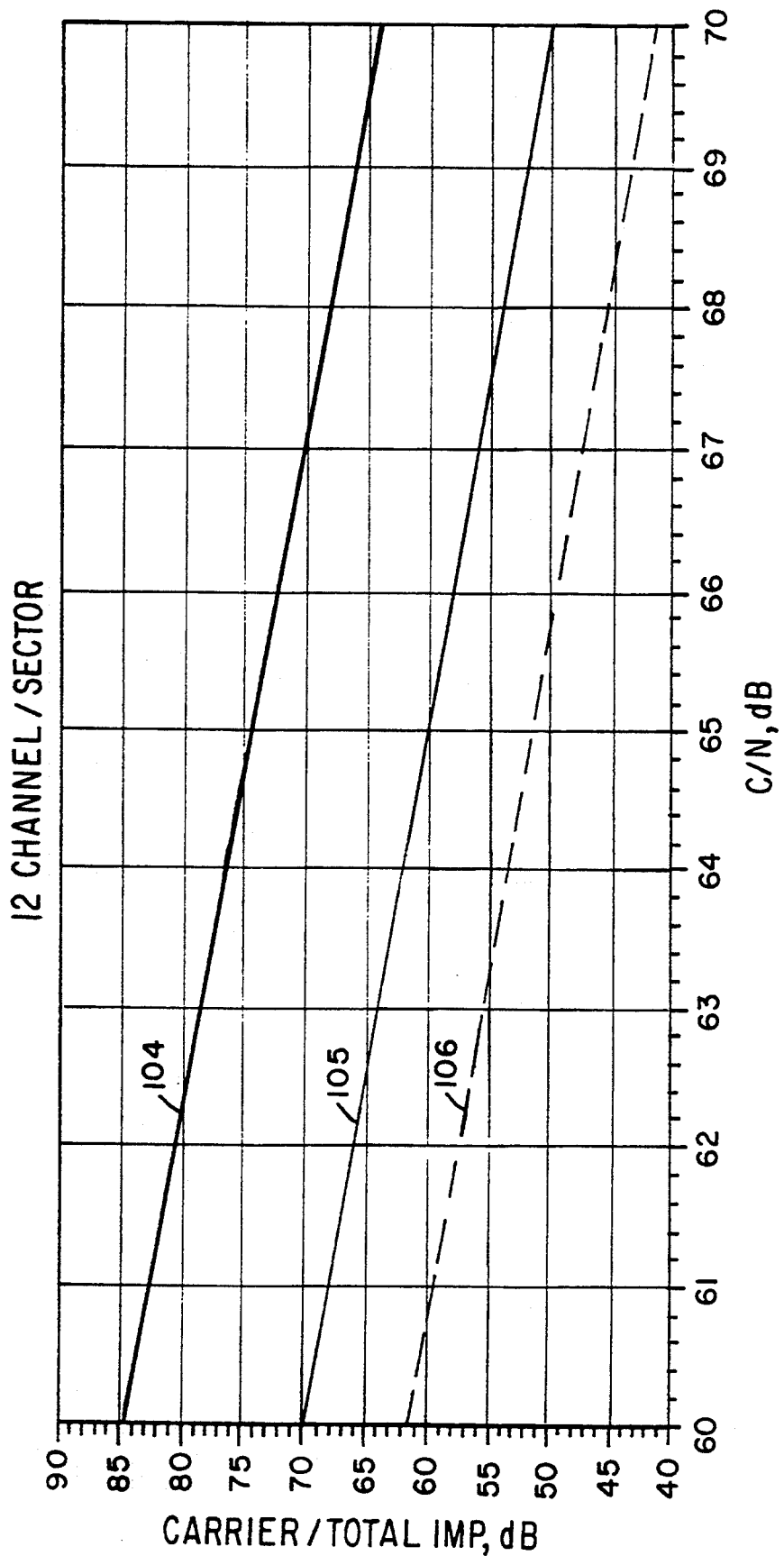
FIG. 11 is a graph comparing C/(Total IMP) and C/N.

There are fourteen components in the downlink from the input of one sector to the output of the same sector. It consisted of a mixer, a bandpass filter, an 8-way combiner, a low pass filter, an amplifier A, an amplifier A, an optic link (including a DFB laser, RIN=−155 dBc/Hz, $(P_{rf})m$=+6 dBm, $IP_3$=+28 dBm at rf input average optic $P_o$=+4 dBm, fiber loss 4 dB and a photodetector, r=0.8 amp/watt), a low pass filter, an amplifier C (G=8 dB, NF=8.5 dB, $IP_3$=+30 dBm), an amplifier C, an 8-way divider, a bandpass filter, an upconverter, and a bandpass filter. FIG. 11 shows the trade off between C/N and the C/(Total IMP) for the downlink. The heavy solid line was obtained by considering only the $IP_3$ of the laser and all rf components were assumed to be perfectly linear. The solid and dotted lines were obtained by using the $IP_3$ of all components and the dotted line corresponds to the worst case downconverter $IP_3$ of +17 dBm and the solid line corresponds to the best case downconverter $IP_3$ of +25 dBm. Again a degradation of about 15 dB is attributed to the inadequate linearity of rf components for this application.

FIG. 12 illustrates a cellular communications system having a base station 10 connected to a three-sector cell site and three single-sector microcells. The cell sites collectively form block 12 in FIG. 2. The three microcells are connected via coaxial cable to a remote hub 14 located at the three-sector cell site. Generally, the fan out to the remote cell sites can be achieved either by the use of RF coaxial cables or fiber optic cables, depending on the transmission distances.

This hub serves as a remote cell fiber optic interface which corresponds to the remote terminal 14 in FIG. 2, and includes an uplink and downlink interface for processing RF uplink and IF downlink signal channels, respectively. The base station fiber optic interface 13 corresponds to the base terminal 13 in FIG. 2, and includes an uplink and downlink interface for processing IF uplink and RF downlink signal channels, respectively.

The remote terminal 14 receives a plurality of RF uplink channels from the remote cellular sites, and optically transmits the signals as an uplink optical channel on an uplink fiber 21-2. For example, transmission medium 32 transports an RF signal received by Sector #3. The RF uplink channels are converted to respective non-overlapping signal bands which are combined to form a composite electrical signal that intensity modulates a laser to produce tile optical channel for transmission on fiber 21-2.

At the base terminal 13, photodetection and frequency conversion are used to individually recover each of the original RF uplink signals received at the mobile cellular sites. The RF uplink bands 16 are then forwarded to base station 10.

The downlink interface in base terminal 13 receives RF downlink channels from base station 10 and converts each RF channel to a respective signal band, and multiplexes the frequency-converted signals into a non-overlapping composite signal that is optically transmitted over fiber 21-1.

The downlink interface in remote terminal 14 photodetects the optical downlink channel, individually recovers each of the RF downlink channels, and forwards each recovered RF signal to its designated cell site.

The fiber optic antenna remoting system of the present invention can be used:

To provide cellular coverage in office or public buildings.
  To provide cellular coverage in tunnels and subways.
  To enhance cellular coverage in areas where direct rf propagation is obstructed.

To provide system design flexibility for microcell applications.

To provide a means for optimal location of antenna site in densely populated areas.

The advantages of fiber optic antenna remoting system are:

Reduction in the physical size of cell sites. Due to the drastic reduction in the size of cell site equipment, it is possible to house the fiber optic interfaces and the radio interfaces required at each cell site in a small enclosure mounted at the base of the antenna support.

Centralized system control. With the use of fiber optic repeater network, all the system control functions and diversity combining/switching functions will be performed in one centralized location, resulting in an enhancement in service quality.

Alleviating the problems associated with the process of site selection. The reduction in the size of cell site equipment eliminates the need of a building at each cell site. This will result in great savings in real estate cost and building cost.

Independent of modulation format used in radio and usable, for example, with analog FM, digital, CDMA.

While there has been shown and described what are at present considered the preferred embodiments of the invention, it will be obvious to those skilled in the art that various changes and modifications can be made therein without departing from the scope in the invention as defined by the appended Claims.

What is claimed is:

1. A communication link for transmitting a plurality of radio frequency (RF) downlink signal bands, each including a plurality of RF transmit channels, from a base station to a remote cellular hub, and for transmitting a plurality of RF uplink signal bands, each including a plurality of RF cellular channels, from the remote cellular hub to the base station, comprising:

downlink conversion means for converting each RF downlink signal band to a respective intermediate frequency (IF) downlink signal band;

downlink generation means for generating a downlink optical channel including said IF downlink signal bands;

downlink transmission means for optically transmitting said downlink optical channel over a first optical path;

downlink detection means at the remote cellular hub for detecting the downlink optical channel and recovering said RF downlink signal bands;

uplink conversion means for converting each RF uplink signal band to a respective IF uplink signal band;

uplink generation means for generating an uplink optical channel including said IF uplink signal bands;

uplink transmission means for optically transmitting said uplink optical channel over a second optical path; and uplink detection means at the base station for detecting the uplink optical channel and recovering said RF uplink signal bands.

2. The communication link as recited in claim 1 wherein said downlink conversion means, said downlink generation means, and said downlink transmission means comprises:

frequency conversion means for converting said plurality of RF downlink signal bands to a corresponding plurality of non-overlapping IF downlink signal bands;

means for combining said plurality of non-overlapping IF downlink signal bands to produce a composite IF downlink signal; and laser means for optically transmitting said composite IF downlink signal on said first optical path as said optical downlink channel.

3. The communication link as recited in claim 2 wherein said frequency conversion means comprises:

means for generating a reference signal;

synthesizer means responsive to the reference signal and a control input for controllably generating a local oscillator signal of selectable frequency;

mixer means responsive to the local oscillator signal and an RF downlink signal band for generating a corresponding IF downlink signal band.

4. The communication link as recited in claim 1 wherein said uplink detection means comprises:

a photodetector means adapted to receive said optical uplink channel and provide a corresponding detected signal representing a composite of IF uplink signal bands;

means for demultiplexing said detected IF composite to recover each of said IF uplink signal bands;

frequency conversion means for converting each of said IF uplink signal bands to a corresponding one of said RF uplink signal bands.

5. The communication link as recited in claim 1 wherein said downlink detection means comprises:

photodetector means adapted to receive said optical downlink channel and provide a corresponding detected signal representing a composite of IF downlink signal bands;

means for demultiplexing said detected signal to recover each of said IF downlink signal bands; and frequency conversion means for converting each of said IF downlink signal bands to a corresponding one of said RF downlink signal bands.

6. The communication link as recited in claim 1 wherein said uplink conversion means, said uplink generation means, and said uplink transmission means comprises:

frequency conversion means for converting the plurality of said RF uplink signal bands to a corresponding plurality of non-overlapping IF uplink signal bands;

means for combining said plurality of non-overlapping IF uplink signal bands to produce a composite IF uplink signal; and laser means for optically transmitting said composite IF uplink signal on said second optical path as said optical uplink channel.

7. The communication link as recited in claim 6 wherein said frequency conversion means comprises:

means for generating a reference signal;

synthesizer means responsive to the reference signal and a control input for controllably generating a local oscillator signal of selectable frequency;

mixer means responsive to the local oscillator signal and an RF uplink signal band for generating a corresponding IF uplink signal band.

8. The communication link as recited in claim 1 wherein:

the RF-to-IF conversion performed by said downlink conversion means is characterized such that intermodulation products and harmonics present in the downlink optical channel due to frequency components from different IF downlink signal bands fall outside of any of said IF downlink signal bands.

9. The communication link as recited in claim 1 wherein:
the RF-to-IF conversion performed by said uplink conversion means is characterized such that intermodulation products and harmonics present in the uplink optical channel due to frequency components from different IF uplink signal bands fall outside of any of said IF uplink signal bands.

10. A communications link between a plurality of mobile cell sites and a base station, comprising:
receiver means coupled to receive a plurality of radio frequency (RF) cellular band receive signals from the mobile cell sites;
conversion means for converting each RF cellular band receive signal to a corresponding intermediate frequency (IF) receive signal;
multiplexer means for generating a composite IF signal including said IF receive signals; and
transmission means for optically transmitting the composite IF signal over an optical medium adaptably coupled to the base station.

11. The communications link as recited in claim 10 wherein the conversion means includes:
means for calculating a spectral assignment frequency plan to determine the proper RF-to-IF conversions such that intermodulation products and harmonics present in the optically transmitted composite IF signal due to frequency components from different IF receive signals fall outside of any IF receive signal band.

12. The communications link as recited in claim 10 further comprises:
detection means coupled to the optical medium for detecting the optically transmitted composite IF signal;
demultiplexer means for recovering each of said IF receive signals from the detected composite IF signal; and
down-conversion means for converting each of said recovered IF receive signals to the corresponding RF cellular band receive signal.

13. The communications link as recited in claim 10 further comprises:
receiver means for receiving a plurality of RF cellular band transmit signals from the base station;
conversion means for converting each of said RF cellular band transmit signals to a corresponding IF transmit signal;
multiplexer means for combining said IF transmit signals into a composite IF signal; and
transmission means for optically transmitting the composite IF signal over an optical medium coupled to the mobile cell sites.

14. The communications link as recited in claim 13 wherein the conversion means includes:
means for calculating a spectral assignment frequency plan to determine the proper RF-to-IF conversions such that intermodulation products and harmonics present in the optically transmitted composite IF signal due to frequency components from different IF transmit signals fall outside of any IF transmit signal band.

15. The communications link as recited in claim 13 further comprises:
detection means coupled to the optical medium for detecting the optically transmitted composite IF signal;
demultiplexer means for recovering each of said IF transmit signals from the detected composite IF signal;
downconversion means for converting each recovered IF transmit signal to the corresponding RF cellular band transmit signal; and
means coupled to the downconversion means for transmitting the RF cellular band transmit signals to the cell sites.

16. A method of communicating between a plurality of mobile cell sites and a base station, comprising the steps of:
receiving a plurality of radio frequency (RF) cellular band receive signals from the mobile cell sites;
converting each RF cellular band receive signal to a corresponding intermediate frequency (IF) receive signal;
combining the IF receive signals into a composite IF signal; and
optically transmitting the composite IF signal to the base station.

17. The method as recited in claim 16 wherein the conversion step includes the step of:
determining the proper level of frequency conversion for each RF cellular band receive signal such that intermodulation products and harmonics present in the optically transmitted composite IF signal due to frequency components from different IF receive signals fall outside of any IF receives signal band.

18. The method as recited in claim 16 further includes the steps of:
receiving a plurality of RF cellular band transmit signals from the base station;
converting each RF cellular band transmit signal to a corresponding IF transmit signal;
combining the IF transmit signals into a composite IF signal; and
optically transmitting the composite IF signal to the mobile cell sites.

19. The method as recited in claim 18 wherein the conversion step includes the step of:
determining the proper level of frequency conversion for each RF cellular band transmit signal such that intermodulation products and harmonics present in the optically transmitted composite IF signal due to frequency components from different IF transmit signals fall outside of any IF transmit signal band.

* * * * *